Figure 1:
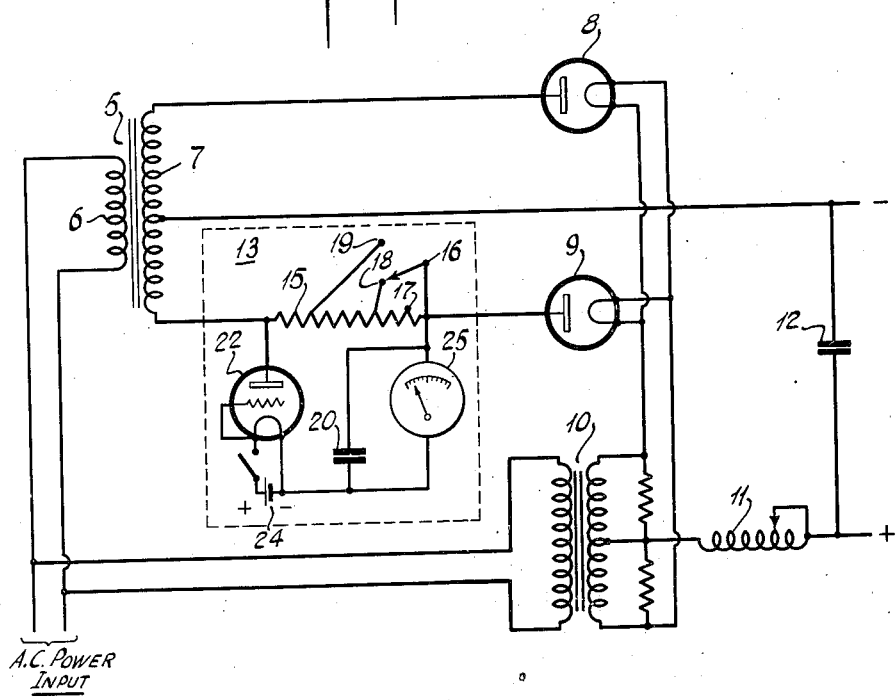

May 31, 1949. C. W. HANSELL 2,472,013
CALIBRATING PEAK CURRENT METER
Original Filed April 11, 1942

INVENTOR
CLARENCE W. HANSELL.
BY H.S. Grover
ATTORNEY

Patented May 31, 1949

2,472,013

UNITED STATES PATENT OFFICE 2,472,013

CALIBRATING PEAK CURRENT METER

Clarence W. Hansell, Rocky Point, N. Y., assignor to Radio Corporation of America, a corporation of Delaware Original application April 11, 1942, Serial No. 438,592. Divided and this application November 20, 1943, Serial No. 511,158

5 Claims. (Cl. 175—18.3)

The present application is a division of my prior application Serial No. 438,592, filed April 11, 1942, now Patent #2,378,846, granted June 19, 1945.

The present invention relates to a system for calibrating instruments for measuring instantaneous peak current intensities.

An object of the present invention is to facilitate the calibration of peak current instruments.

A further object of the present invention is the provision of means for calibrating and checking the operation of peak current instruments.

Still another object of the present invention is the calibration of a peak current instrument as described in my prior Patent #2,378,846, granted June 19, 1945, of which this application is a division.

The peak current instrument of the present application includes a relatively small resistance adapted to be connected in series with the circuit in which the peak current intensities are to be measured. The resistance must have such a small value that it will have a negligible effect on the peak current in the circuit. Then the peak potential drop across the resistance is measured. The measurement is performed by impressing the potential across a rectifier or other unilaterally conductive device and a condenser in series, the circuit being so arranged that the condenser charges up to substantially the peak potential across the resistance. The potential across the condenser may then be measured directly by means of a low current, high resistance voltmeter. The resistance of the voltmeter must be such that only a very small drop in the condenser potential takes place between pulses of current from the rectifier. Under such circumstances, the current taken by the meter causes a negligible error. The arrangement may be calibrated for a potential range corresponding to one range of current intensities and the instrument may thereafter be used to measure any other desired range of current intensities by using appropriate resistances across which the potential drop is developed.

The instrument may be checked and calibrated by applying definitely known values of current through the calibrating resistance for short time periods by means of a commutator or vibrator. By using a suitably designed commutator, the current pulse frequency and also the ratio of time with current on to time with current off may be varied over a wide range. The steady state current through the circuit may be measured by a conventional direct current ammeter if the commutator is stopped in a closed circuit position. The steady state current, assuming the circuit is substantially purely resistive in nature, is the same as the peak current value obtained with the commutator in operation.

Figure 2:
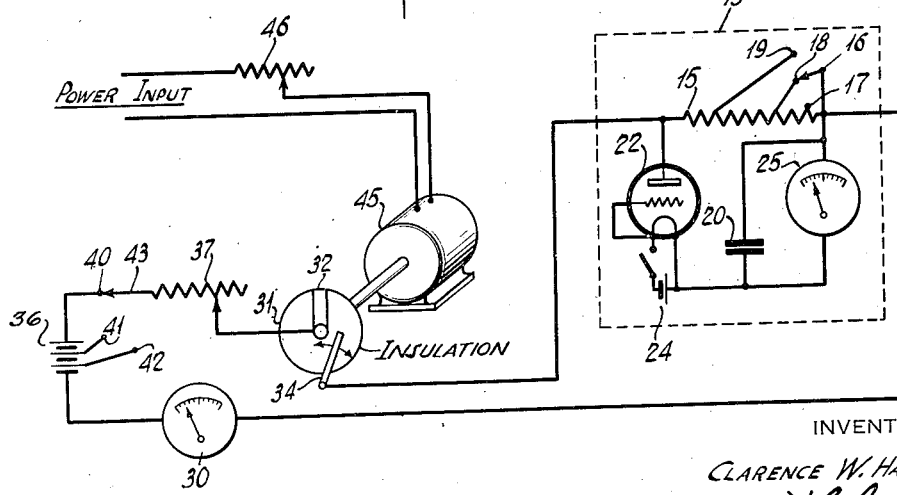

The present invention may be more fully understood by reference to the following detailed description, which is accompanied by a drawing in which Figure 1 illustrates a peak current instrument which may be calibrated by the system of the present invention, while Figure 2 illustrates a circuit embodying the present invention.

In Figure 1 there is shown a rectifier circuit including a power transformer 5 having primary and secondary windings 6 and 7, each end of the secondary winding 7 being connected to an anode of rectifier tubes 8 and 9, while a center-tap connection constitutes the negative output lead. The filaments of the rectifier tubes 8 and 9 may be heated from the A. C. power supply through a filament transformer 10, as is well known in the art, the positive output lead being connected to the center tap of the secondary of the filament transformer 10. A variable current limiting reactor 11 is provided between the rectifier and smoothing condenser 12 to adjust the peak current to the condenser on each charging cycle. The direct current output of the rectifier circuit, as so far explained, is limited by the ability of rectifier tubes 8 and 9 to withstand the peak current impulses passing therethrough to charge condenser 12.

If condenser 12 has a fairly high capacity, the peak charging pulses may exceed in amplitude by several times the average current drawn out of the rectifier circuit. In order to determine whether or not these peak current pulses exceed the rating of rectifier tubes 8 and 9, I propose connecting in series with first one and then the other of the rectifier tubes, a peak current measuring instrument generally indicated by reference numeral 13. The instrument contains a small tapped resistor 15 which is connected in series in the rectifier circuit. The resistance of this resistor 15 must be accurately known, both as to its total value and as to the value with switch 16 in contact with the various taps 17, 18, 19.

Across resistor 15 is connected a series circuit including condenser 20 and rectifier tube 22. Rectifier tube 22 is so connected that potential peaks developed across resistor 15 cause current to flow through the rectifier tube 22 to charge condenser 20. Then, as the peak potential across resistor 15 subsides to a value less than the potential across condenser 20, the rectifier tube 22 prevents the condenser 20 from being discharged across the resistor.

While I have shown rectifier tube 22 as a thermionic type of rectifier having a filament heated by battery 24, it is, of course, within the scope of my invention to utilize dry contact type rectifiers, if desired.

The peak potentials developed across condenser 20 are measured by a low current drain voltmeter 25 having a very high internal resistance.

The resistance of voltmeter 25 is such that the condenser 20 is only slightly discharged by the current drawn by the meter during the time interval between peaks of current drawn through resistor 15. Thus the meter 25 may be calibrated in terms of peak current values in resistor 15 with only negligible error. The scale of the instrument or range of peak current values measured thereby may be readily changed by means of tap switch 16 selectively contacting tap 17, 18 or 19 on resistor 15. As portions of resistor 15 are successively short circuited by switch 16, the scale of the instrument is correspondingly multiplied.

In Figure 2 I have shown a circuit whereby the peak current instrument 13 may be calibrated by comparing its current reading with a standard ammeter 30. Ammeter 30 may be any well-known type of direct current instrument. The current measured by it is a direct current of unvarying amplitude. The calibration circuit includes a commutator 31, the commutator comprising an insulating disc 31 carrying a radial conducting strip 32 thereon. The contact brush 34 is arranged to swing in an arc over the face of insulating disc 31 from a point near its center to a point near the perimeter. Thus the relationship of the time that the brush 34 is in contact with conductive segment 32 with respect to the time that the brush 34 is out of contact with the segment may be adjusted over a wide range. In a series arrangement with the commutator 31 are connected the peak current instrument 13, standard ammeter 30, a battery 36 and a current adjusting rheostat 37. The potential of battery 36 may be varied by means of taps 40, 41 and 42, which may be selectively contacted by switch arm 43, thus roughly adjusting the current in the circuit, the fine adjustment being made by rheostat 37. In use, the commutator 31 is first so adjusted that conductive segment 32 is in contact with brush 34. The tap switch 43 and rheostat 37 are then so adjusted that the standard ammeter 30 reads some definite and predetermined current value. It will be noted that at this time the direct current measured by ammeter 30 is of uniform amplitude. Thus the instrument may be any familiar direct current instrument. Motor 45 is then started thus rotating disc 31, the speed being adjusted by rheostat 46. The position of brush 34 along a radius of disc 31 is then varied in order to obtain the desired current-on/current-off ratio in the circuit. The reading of meter 25 in instrument 13 is then recorded. The current value in the circuit may then be changed to a different value and thus an entire series of calibration points be determined for meter 25.

While I have shown and particularly described several embodiments of my invention, it is to be distinctly understood that my invention is not limited thereto but that modifications within the scope of my invention may be made.

What I claim is:

1. The method of calibrating a peak current instrument including the steps of establishing a fixed amplitude of current flow in a continuous circuit including said peak current instrument, measuring said current flow, cyclically so interrupting said circuit as to obtain a desired current-on/current-off ratio, recording the reading of said peak current instrument, and repeating said steps over a wide range of current values to obtain a complete calibration of said peak current instrument.

2. The method of calibrating a peak current instrument including the steps of establishing a fixed amplitude of flow in a continuous circuit including said peak current instrument, measuring said current flow, cyclically so interrupting said current circuit as to obtain a desired current-on/current-off ratio, recording the reading of said peak current instrument while said circuit is being cyclically interrupted, re-establishing a continuous circuit, establishing a different amplitude of current flow through said circuit, again cyclically interrupting said circuit to obtain the same ratio of current-on to current-off and again recording the reading of said peak current instrument, said steps being continued over a range of different current values as to obtain the characteristic of said peak current instrument over substantially its entire range.

3. A circuit arrangement for calibrating a peak current instrument, comprising a circuit including a standard direct current instrument, the peak current instrument to be calibrated and a periodic circuit closer connected in series, and means to apply direct current to said series circuit, said circuit closer having means to vary the periodicity of operation thereof and means to adjust the current-on/current-off ratio afforded thereby.

4. A circuit arrangement for calibrating a peak current indicating instrument, comprising a circuit having instrument calibrated to indicate steady-state direct current values, the peak current indicating instrument to be calibrated and a periodic circuit closer connected in series, said circuit closer having means to vary the open-closed ratio and means to vary the periodicity of operation thereof, and means to apply a given value of direct current to said series circuit.

5. A circuit arrangement for calibrating a peak current indicating instrument, comprising a circuit having an instrument indicating steady-state direct current values, the peak current indicating instrument to be calibrated and a circuit interrupting device connected in series, said device comprising a rotatable insulating disc having on one face thereof a radial conductor of uniform width and a stationary brush bearing on said face and arranged to be adjustably positioned at various distances from the center of said disc whereby the open-to-closed ratio of said circuit closer may be varied, and means to connect an adjustable source of direct current to said series circuit.

CLARENCE W. HANSELL.

REFERENCES CITED

The following references are of record in the file of this patent:

UNITED STATES PATENTS

| Number | Name | Date |
| --- | --- | --- |
| 1,372,821 | Knopp | Mar. 29, 1921 |
| 1,611,716 | Brown | Dec. 21, 1926 |
| 2,014,102 | Conklin | Sept. 10, 1935 |

OTHER REFERENCES

Standard Handbook for Elec. Engineers, 6th ed., p. 165, pub. 1933, by McGraw Hill Book Co., New York.

Experimental Elec. Engineering, Karapetoff, p. 65, pub. 1907, by John Wiley & Sons, New York.